April 19, 1966  W. L. PARKS III, ETAL  3,247,362
SCANNER FOR SUPERIMPOSED CARD INFORMATION RETRIEVAL SYSTEM
Filed Nov. 30, 1961  2 Sheets-Sheet 1

INVENTORS:
WM. L. PARKS, III
WM. P. GINGRAS
FREDERICK JONKER

BY Homer R. Montague
ATTORNEY

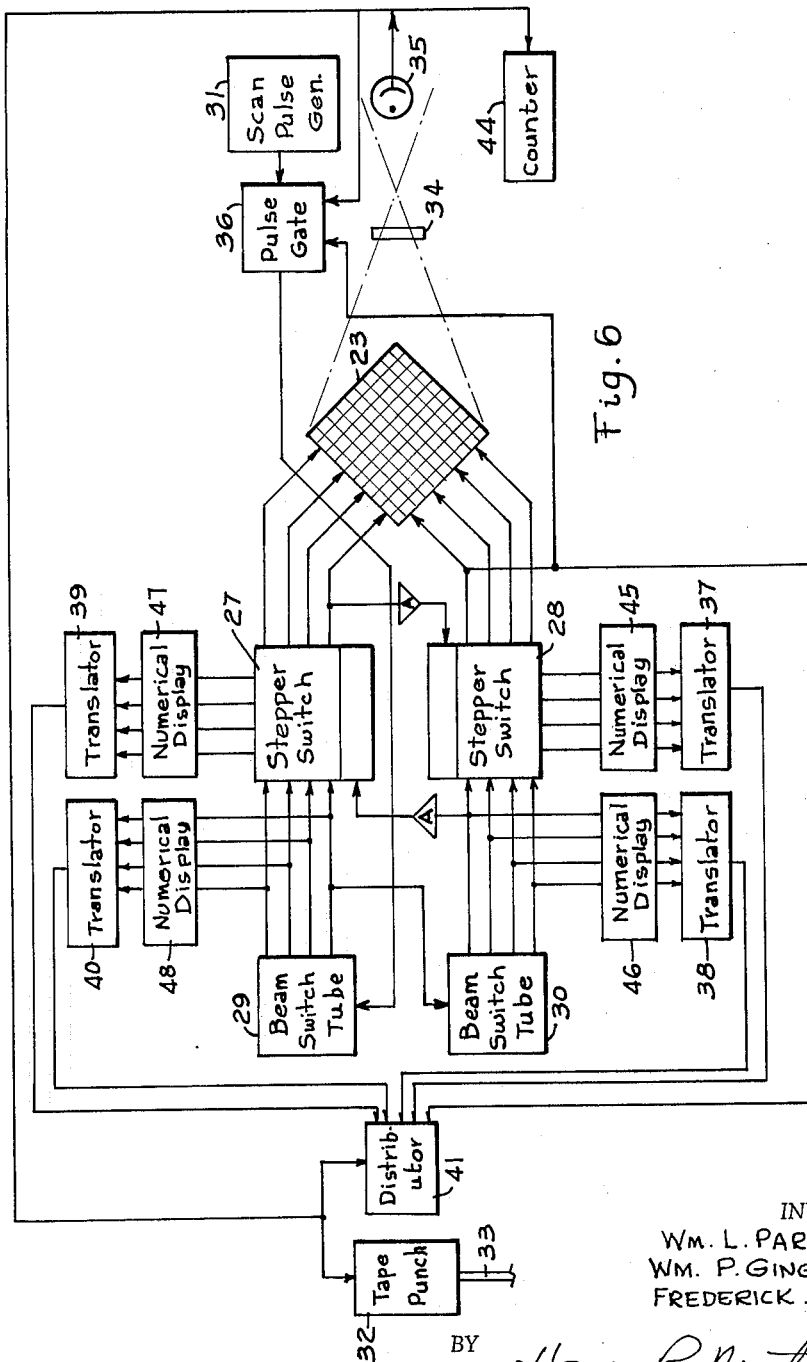

United States Patent Office 3,247,362
Patented Apr. 19, 1966

3,247,362
SCANNER FOR SUPERIMPOSED CARD INFORMATION RETRIEVAL SYSTEM
William L. Parks III, Silver Spring, and William P. Gingras, Rockville, Md., and Frederick Jonker, Washington, D.C., assignors to Jonker Business Machines, Inc., a corporation of Delaware
Filed Nov. 30, 1961, Ser. No. 156,100
7 Claims. (Cl. 235—61.11)

This invention pertains to information retrieval systems based on the use of superimposable cards dedicated to terms and the determination of coincidence of holes in said cards. These systems are also known as Peekaboo systems. Commercially they are known as Termatrex systems.

In the Termatrex systems, an item of information is prepared for entry into the system by first indexing it by a number of terms taken from a vocabulary of terms. Each item of information is also given an accession number.

Termatrex systems comprise a number of cards each dedicated to a term. In total there will generally be a vocabularly of between 500 and 5000 terms. On each term card is a place (or a combination of places) dedicated to each item of information in the collection. Each item has the same positions dedicated to it on each term card.

Items of information are entered into a Termatrex system by selecting all of the term cards by which that item has been indexed, placing these cards in superimposition in a Termatrex machine and drilling one or more holes in all of these cards simultaneously at the position dedicated to that item of information.

The system is searched by selecting a number of term cards together describing a search question, and placing these in superimposition in a Termatrex machine. Next, a light in the bottom of the Termatrex machine is turned on. The coinciding holes in these term cards are then visible as light dots. The serial number of these light dots can then be read off one by one, for example, by means of a transparent grid with an x-y coordinate system on it.

Generally, only one position is dedicated to each document. The serial number of the document could then correspond to the x-y coordinates of that position. For example, document #2515 would have its position at a location with 25 as the Y coordinate and 15 as the X coordinate.

Sometimes this equipment is used for the collection of statistical data. In that case, a number of term cards are placed in superimposition in the machine and the number of coinciding holes are counted.

The present invention describes a novel type of flying spot scanner that can be used for that purpose. It will also be able to read off the coordinate positions corresponding to the document numbers and transfer the same to printed paper tape or some other storage medium.

Figure 1:
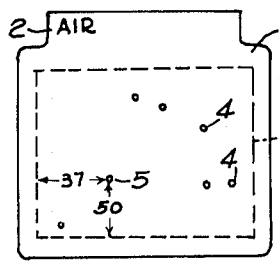
Figure 2:
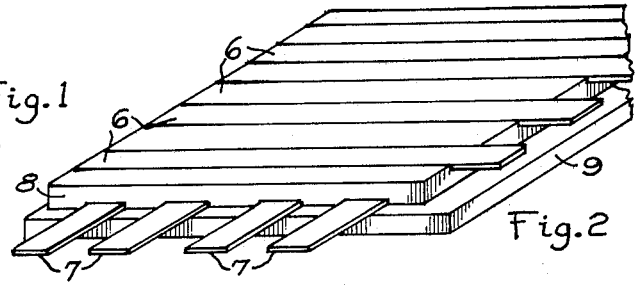
Figure 3:
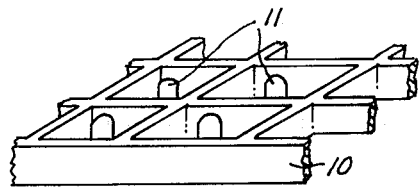
Figure 4:
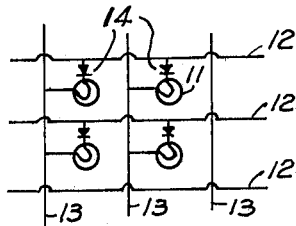
Figure 5:
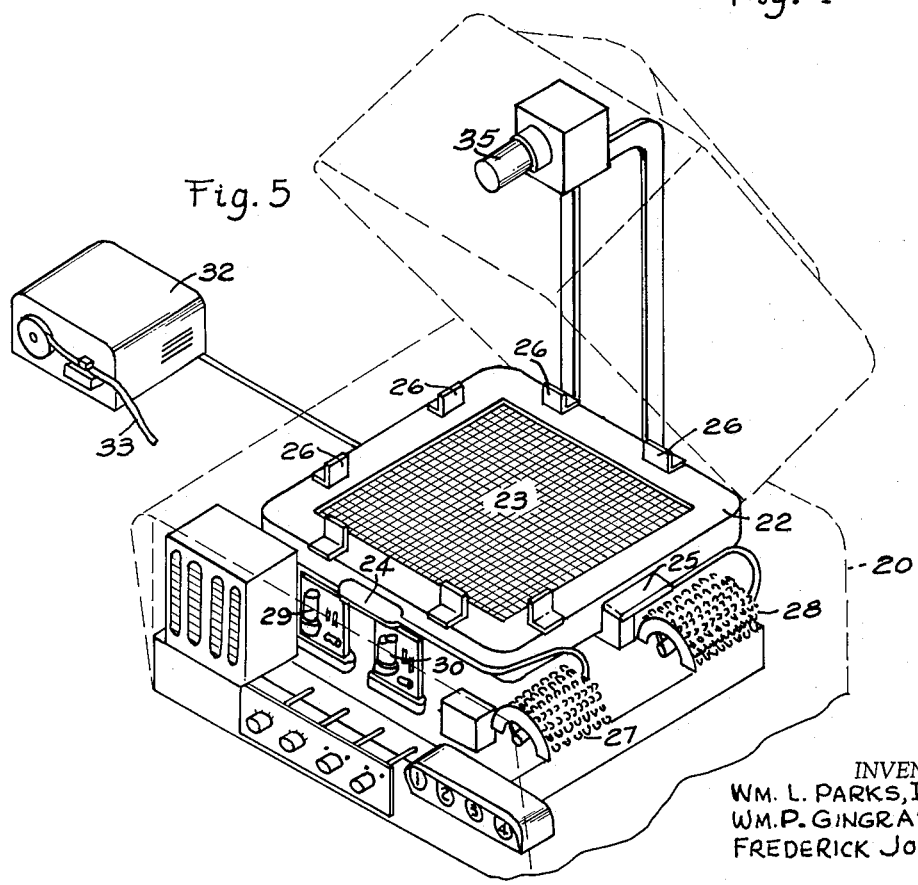

The invention will now be explained with the aid of the following figures;
FIGURE 1 shows a term card.
FIGURE 2 shows in perspective part of the electroluminescent matrix used in the scanning process.
FIGURES 3 and 4 show respectively a light bulb matrix and a circuit for the same.
FIGURE 5 shows a perspective view, partly in phantom lines, of the device according to the invention.
FIGURE 6 shows a block diagram of the operation of the scanner.

It is possible to use various types of mechanical-optical scanners which scan a line at a time. These will be in general, too slow, complex and very expensive. They are sensitive and potential sources of trouble.

It is, of course, possible to use a cathode ray tube as a flying spot scanner. These are extremely fast. However, they are very expensive and electronically quite complex.

Moreover, the extremely high speeds possible with C.R.T. flying spot scanners are not needed. A scan time of 1–2 seconds for cards having 10,000 positions would be more than adequate.

Instead of a C.R.T., a matrix of individual bulbs could be used. However, with a position spacing on the term cards of 12 positions to the inch, this becomes not too practical.

Thus the invention utilizes instead of a C.R.T. or a bulb matrix, an electroluminescent matrix (E-L matrix). It permits maximum scanning speed of about 1 second for 10,000 positions. This E-L matrix is very inexpensive and simple. Because of the low speed the drive of the scanning signal can likewise be extremely simple and inexpensive and comprises two mechanical commutators such as two stepping switches, and electronic commutators such as two beam switching tubes.

According to the invention, the device can also be used to create term cards on film with transparent spots instead of holes.

FIGURE 1 shows a Termatrex card. The area 3 contains the positions dedicated to documents that may be perforated. For example, the cards could have 10,000 positions, giving the system a capacity of 10,000 documents per set of cards. Numerals 4 designate perforated positions. Based on the matrix of 10,000 positions, hole 5 having (37) and (50) as X and Y coordinates respectively is dedicated to document 3750. However, other ways of correlating position and document number are possible and it is also possible to identify documents by a combination of positions instead of one.

FIGURE 2 shows the preferred light matrix, comprising an electroluminescent sandwich 8 and a set of conductors 6 on one side and another set 7 on the other side. Numeral 9 designates a support plate to give the assembly sufficient physical strength.

FIGURE 3 shows an alternative light matrix comprising bulbs 11, located in an egg crate like structure 10.

FIGURE 4 shows how each of these bulbs is wired between a conductor of the set of conductors 12 and one of the set of conductors 13 in series with a diode 14.

FIGURE 5 shows a phantom view of the device. It is contained in a box 20 having a lid 21. A cardholder 22 is mounted on top of the power supply and drive electronics. The E-L matrix 23 is mounted directly under the cardholder 22. 24 and 25 respectively are the connectors for the two sets of electrodes. The blocks 26 align the superimposed cards to be placed on top of the E-L matrix. Numerals 27 and 28 designate stepping switches and numerals 29 and 30, beam switching tubes.

The photosensitive element, in this case, is a photomultiplier tube 31 mounted on a bracket at some distance over the E-L matrix 23. Numeral 32 designates a paper tape punch furnishing paper tape 33.

Instead of punched paper tape, it is also possible to use a printed output such as an adding machine printer or to have output go directly on magnetic tape.

The drive of the scanning signal could be effected entirely electronically, for example, by means of 10 beam switching tubes of 10 positions each for the X axis and the same for the Y axis. However, the cost would be very high and these high speeds would anyway not be needed.

According to the invention, it is advantageous to replace the X axis commutation by an electronic means. A preferred way of scanning is to have the matrix divided into for example 100 sub matrices which are scanned one by one completely electronically. Mechanical commutation means can switch the scanning action from one sub matrix to another.

FIGURE 6 shows a block diagram of a preferred way of switching this scanning signal for the E-L matrix 23 or the lightbulb matrix. The matrix taken as an example has 100 x 100 positions. The lightspot is commutated throughout the entire matrix by means of two electronic beam switching tubes 29 and 30 working in conjunction with two 10-pole, 10-position electrical stepper switches 27 and 28. A minor scan of a small 10-line by 10-line area is generated by the X and Y beam switching tubes 29 and 30. The scan pulse generator 31 of 10 kc. feeds the X beam switching tube 29 containing 10 output targets. Each target is gated to energize one of ten conductors of the E-L matrix 23. This causes each target in turn to be energized, which sequentially energizes each of ten E-L matrix conductors. When number 9 target of the X beam switching tube 29 is energized, the Y beam switching tube 30 is pulsed or caused to move one target, applying voltage to the next horizontal line. The ten targets of the beam switching tube 29 are again sequenced and the process is repeated. Thus, the two beam switching tubes will generate a minor scan of this ten by ten conductor area in 1/100 of a second.

The two stepper switches 27 and 28 form a major scan. The X stepper switch 27 in number one position connects the ten targets of the X beam switching tube 29 to conductors 0 through 9 of the E-L matrix 23. When stepped to number 2 position by the Y beam switching tube 30 at the completion of a minor scan, the X stepper switch 28 connects the ten targets of the X beam switching tube 29 to conductors numbered 10 through 19 of the E-L matrix 23, etc. When the X stepper switch 28 arrives at number 10 position, the stepper switch moves the 10 targets of the Y beam switching tube 30 from conductors 0 through 9 to conductors 10 through 19 on the E-L matrix, etc. The major scan continues in this manner until all 100 major areas have been sequenced. Since each major area was completely swept by the minor scan, all 10,000 of the hole stations emitted a lightspot, one at a time, which is the required effect. A 10,000 hole scan, using this minor-major scan technique, consumes approximately 1.6 seconds.

As the lightspot sequentially "moves" over the matrix 23, coincident holes in the superimposed termcards positioned at 34 admit light to the photocell 35. This feeds a stop command to the pulse gate 36. The lightspot ceases to move and remains at this coincident hole for a period of time. The interval delay is set by the pulse gate. This will permit address display or print out. When this time interval is finished, the stop command ceases, the scan pulses start again and the X and Y beam switching tubes 29 and 30 and stepper switches 27 and 28 continue to the next coincident hole where the cycle is repeated.

When the phototube 35 senses a lightspot and the scan is momentarily stopped, the X and Y address of that particular coincident hole must be determined. Translators convert this address into proper form for entry into a paper tape punch. 37 and 38 designate the translators for the first and second Y digits. 39 and 40 designate the translators for the first and second X digits. One method of address readout is to sense the position of the energized targets in the beam switching tubes and the position of the stepper switches. These provide four 10-position outputs which exactly correspond to the four decimal digits associated with manual address readout in known Termatrex systems. Since paper tape requires binary information input, four decimal to binary digit translators are required. These are simple diode translators which accept 10-unit code input and provide 4-unit binary code output. The first Y digit translator senses the Y stepper switch position. The second Y digit translator senses the Y beam switching tube position, etc.

One method of address punching on paper tape uses space dedication as follows: Five-channel-wide paper tape is used, 4 channels for binary digit information and 1 channel for signalling the beginning of each new hole address. The first Y digit is punched in binary form at the first station of the paper tape. The second Y digit is likewise punched at the second station of the paper tape. The process is repeated until all four digits have been punched. Since only one station can be punched at a time, a digit distributor 41 is required which links the paper tape punch 32 and the four digit translators plus the frame digit. The digit distributor 41 may be a shift register, multiple ring counter or stepper switch. Its sequence is initiated by a print command from the phototube 35. Its task is to connect four of the paper tape punches sequentially to the digit translators. The digit distributor steps to the next translator each time the paper tape 33 is advanced one station. A typical punch paper tape output from a Termatrex information or data search is a long series of four-station addresses punched in binary form. A fifth channel locator hole signals each address heading. This paper tape 33 can now be run "off line" through a tape reader and printer. This will produce a printed hard copy list of document numbers for further use. The punched paper tape may also be used as a computer input for further data processing or for conversion to tab cards.

If a hole count is required, the translators, digit distributor and paper tape punch are not used. An electronic totalizing counter 44 containing four decade scalers is connected to the output of the phototube 35. The flying spot scanner operates as before with the phototube producing an output pulse for each coincident hole which is entered into the counter. Since the counter can accept the information at a very high speed, the E-L matrix does not require a stop command and may continue at full rate. When the scan is completed, the decimal numbers on the electronic counter 44 represent the total number of fully coincident holes in that Termatrex stack.

If an address or document number display only is required, the translators 37, 38, 39, 40, digit distributors 41, paper tape punch 32 and electronic counter 44 are not used. The E-L matrix operates as before with the phototube 35 stopping the scan when a coincident hole is reached. One method of visual address display utilizes numeral indicator tubes known as "Nixie" tubes. Four display tubes 45, 46, 47 and 48 are required, one for each decimal digit in a Termatrex address. These display tubes are connected to the X and Y beam switching tubes and stepper switches similarly to the digit translators described earlier. The energized targets and stepper wiper arms appropriately light a decimal numeral in each of the display tubes. This display is presented to an operator who may manually record or photograph the address numerals. When this is completed, the operator resets the pulse gate which removes the stop command and permits the flying spot on the E-L matrix 23 to continue to the next coincident hole.

While only certain embodiments and modifications of the invention have been discussed, the invention comprises all embodiments and modifications contained within the scope of the claims.

What is claimed is:

1. Apparatus for registering the occurrence of aligned light-transmitting spots of superposed matrix-type record cards, comprising a support for holding in aligned superposition a plurality of such cards, a point-by-point selectively illuminatable generally planar light source disposed on one side of a stack of cards supported by said support, photoelectric sensing means disposed on the opposite side of such stack of cards for receiving light transmitted through any and all points of such cards, which are coincidentally light-transmitting, to transmit light from said light source towards said sensing means, and means for sequentially energizing in turn the respective points of said light source, to excite said sensing means in timed relation to the occurrence of light transmission through coincidentally light-transmitting regions of corresponding points on all of said cards.

2. Apparatus in accordance with claim 1, in which said light source comprises an electro-luminescent panel.

3. Apparatus in accordance with claim 2, said panel having generally orthogonal sets of spaced-apart linear exciting electrodes disposed on its opposite major surfaces, for selectively exciting spaced discrete points of said panel to a luminescent condition.

4. Apparatus in accordance with claim 3, in which the means for sequentially energizing said respective points of said panel comprises electronic beam switching tubes connected to one set of said electrodes, and mechanical stepping switches connected to the other set of said electrodes.

5. Apparatus in accordance with claim 1, in which said light source comprises a rectangular array of incandescent lamps.

6. Apparatus in accordance with claim 1, and means for counting the occurrences of excitation of said sensing means.

7. Apparatus in accordance with claim 1, and means controlled jointly by said sensing means and by said sequential-energizing means for recording the locations of the said coincidentally light-transmitting regions of corresponding points on all of said cards.

References Cited by the Examiner

UNITED STATES PATENTS

| | | | |
|---|---|---|---|
| 2,906,819 | 9/1959 | Smith | 235—61.11 X |
| 2,933,245 | 4/1960 | Fitch et al. | 235—61.115 |
| 3,011,703 | 12/1961 | Rand | 235—61.115 |
| 3,046,540 | 7/1962 | Litz et al. | |

FOREIGN PATENTS 731,342   6/1955   Great Britain.

ROBERT C. BAILEY, *Primary Examiner.*

DARYL W. COOK, MALCOLM A. MORRISON,
*Examiners.*

G. D. SHAW, *Assistant Examiner.*